United States Patent [19]

Walton et al.

[11] Patent Number: 4,930,151
[45] Date of Patent: May 29, 1990

[54] TELEPHONE CALL FORWARDING DEVICE

[75] Inventors: Paul B. Walton, Silver Spring; James Keough, Rockville, both of Md.; Richard L. Demers, Dale City, Va.; Leland A. Denny, Jr., Frederick, Md.; Robert E. Kaiser, Rockville, Md.; Cornellius Moses, Jr., Silver Spring, Md.; Vijay N. Wagh, Derwood, Md.

[73] Assignee: General Electric Company, N.Y.

[21] Appl. No.: 352,515

[22] Filed: May 16, 1989

[51] Int. Cl.⁵ .................. H04M 11/06; H04M 3/54
[52] U.S. Cl. ........................... 379/94; 379/211; 379/210; 379/28
[58] Field of Search ............ 379/211, 210, 94, 97, 379/98, 93, 212, 201, 96, 1, 2, 28, 32

[56] References Cited

U.S. PATENT DOCUMENTS

| | | | |
|---|---|---|---|
| 3,651,272 | 3/1972 | Knollman | 379/157 |
| 4,215,243 | 7/1980 | Maxwell | 379/94 |
| 4,408,100 | 10/1983 | Pritz et al. | 379/67 |
| 4,484,031 | 11/1984 | Gray | 379/212 |
| 4,674,116 | 6/1987 | Curtin | 379/211 |
| 4,682,354 | 7/1987 | Vanacore | 379/211 |

Primary Examiner—James L. Dwyer

[57] ABSTRACT

A call forwarding device includes a plurality of selectively interconnectable channel switches, each having a rotary port connected to a different outlet port of a telephone rotary switch and a modem port connected with a different modem of a facility answering site. An inbound call on any channel switch rotary port is initially directed to the modem port of the same channel switch for answer by the connected modem. If this modem fails to timely answer, the call is automatically re-routed internally of the answering site to the modem port of another, available channel switch for answer by its connected modem or is automatically re-routed to the rotary port of another, available channel switch and call forwarded externally to a backup answering site for answer by a modem thereat.

36 Claims, 6 Drawing Sheets

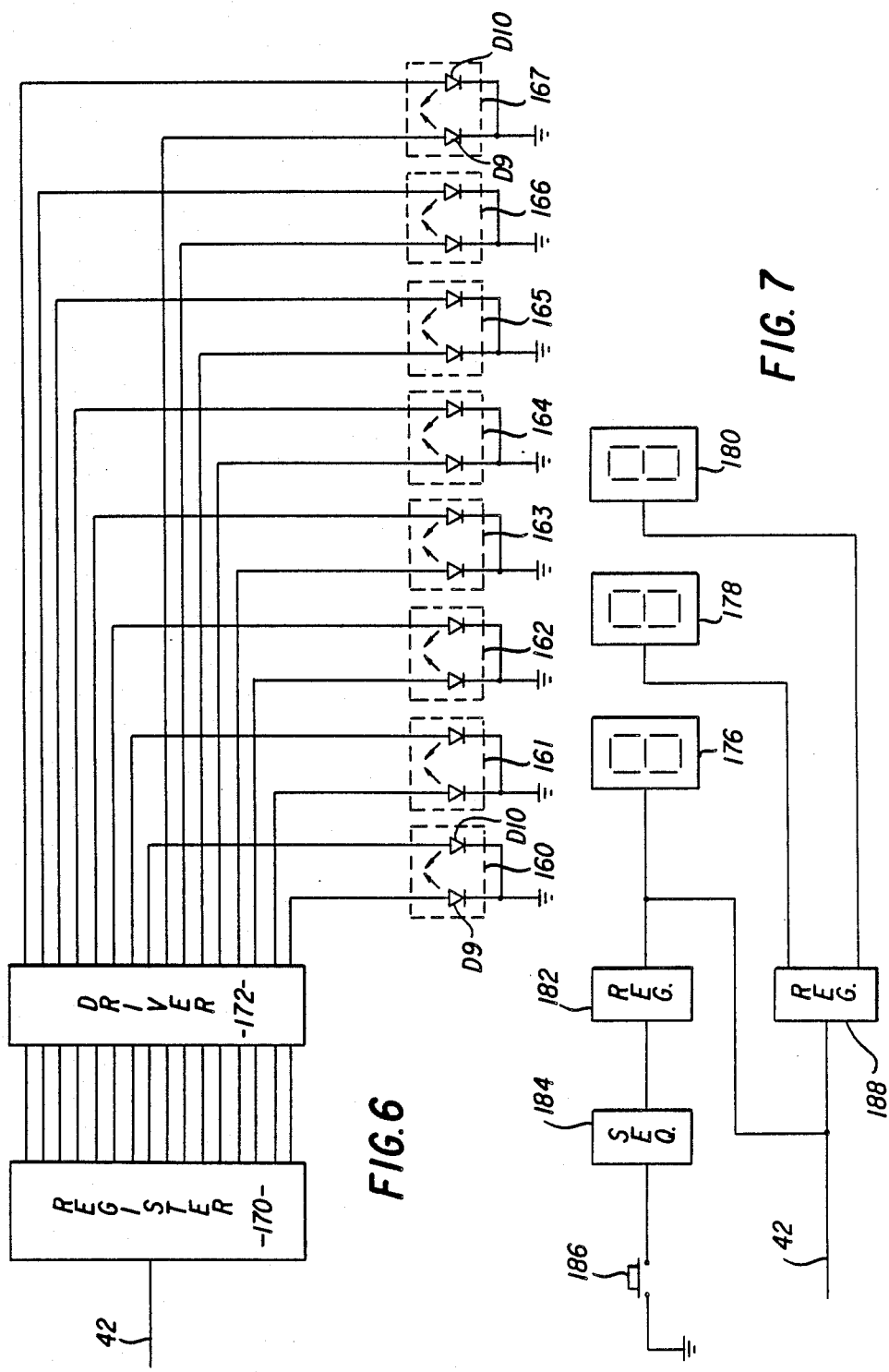

TELEPHONE CALL FORWARDING DEVICE

The present invention relates to telecommunications systems and particularly to a call forwarding device for selectively re-routing incoming telephone calls over telecommunications channels available to handle the calls.

BACKGROUND OF THE INVENTION

Subscribers to the data processing services offered by a central computer facility typically rely on the existing telephone system to access the facility. That is, a subscriber will dial the telephone number of the facility, and, when a selected one of plural modems serving the facility answers, the subscriber's computer can then communicate with the central computer. Alternatively, the subscriber's computer may be equipped with an automatic dial-up feature to call the facility and communicate with the central computer. Since there are plural telephone lines into the facility, many subscribers may be served by the central computer simultaneously via parallel telecommunication channels.

For each subscriber call, selection of the particular facility modem to answer is made by a rotary switch based on the order in which the calls are received. Heretofore, a facility modem has been dedicated to each separate communication channel extending from each of the plural rotary outlet ports to the central computer. If the selected modem rings, but for some reason does not answer (ring-no answer-RNA), the subscriber's call is not completed. The subscriber must hang up and then re-dial, hoping this time the rotary-selected facility modem will answer. These ring-no answer conditions not only waste time, but can block rotary selection of other modems capable of answering. The consequent inconvenience os a constant source of subscriber complaint. Another source of subscriber complaint is occasioned when the selected facility modem is found to be busy, i.e., off-hook. Again, the subscriber must hang up and redial.

Modem RNAs and off-hook or busied-out facility modems are conditions typically caused by a malfunction of the facility equipment in the affected communication channels. Since a malfunctioning facility communication channel can not be detected from the telephone utility side of the rotary, it will normally be selected again and again in response to subsequent subscriber calls. Thus, if the communications channels on the facility side of the rotary are not regularly monitored, the existence of facility equipment malfunction does not become known until subscriber camplaints come rolling in. This is particularly so where the facility answering site is unattended.

It is accordingly an object of the present invention to provide improved telecommunications access to a central facility for multiple users of the services afforded by the facility.

An additional object is to provide a call forwarding device for affording ready telecommunications access to a central facility for users thereof.

A further object is to provide a call forwarding device of the above-character for selectively re-routing telephone calls on incoming lines to available outgoing lines pursuant to establishing viable telecommunication channels.

A still further object is to provide a call forwarding device of the above-character for selectively re-routing incoming telephone calls on any rotary lines to other avialable rotary lines as outgoing telephone calls.

Another object is to provide a call forwarding device of the above-character, wherein an incoming call designated for a particular telecommunication channel is automatically re-routed to an alternative telecommunication channel when the designated channel is found to be incapable of handling the call.

An additional object is to provide a call forwarding device of the above-character which is selectively capable of operating in several different call forwarding or re-routing modes.

Yet another object is to provide a call forwarding device of the above-character, which is capable of accumulating a record of each re-routed call, such that defective telecommunications channels can be readily identified and expeditiously remedied.

A still further object is to provide a call forwarding device of the above character, which is efficient in construction, convenient to implement and control, and reliable in operation.

Other objects of the invention will in part be obvious and in part appear hereinafter.

SUMMARY OF THE INVENTION

In accordance with the present invention, there is provided a call forwarding device having particularly, but not limited application in a telecommunications network affording multiple subscribers simultaneous access to the data processing services availed by a central computer facility. The call forwarding device is stationed to the facility side of the telephone utility rotary switch and has a separate rotary port wired to each of the rotary outlet ports. Each rotary port is assigned a separate device modem port to which it is normally internally connected. Each device modem port is connected with a separate modem for converting analog information to digital information and vice versa as part of a separate telecommunications channel affording two-way data communication between a subscriber's computer and the facility central computer.

Thus, under normal circumstances a subscriber call inbound to one rotary port of the call forwarding device from the rotary is routed to its assigned modem port to ring the facility modem connected therewith. If this modem answers, a normal telecommunications channel is completed, and data communication thereover can begin. However, if this facility modem does not answer within a predetermined number of rings or is busied out, the call forwarding device automatically re-routes the incoming subscriber call over an available one of multiple alternate telecommunications channels to another facility modem for answering. In accordance with an important feature of this present invention, the call forwarding device is capable of operating in either internal or external re-routing modes. In the internal re-routing mode, an initially unanswered subscriber call arriving at any device rotary port is re-routed to any available (not busy) device modem port to which a facility modem capable of answering is connected. In the exteranl mode, the call forwarding device, in response to an initially unanswered incoming call at one of its rotary ports, dials out via another, available one of its rotary ports, the rotary and the telephone utility to a second or backup facility answering site. When a facility modem at the second site answers, an alternative external telecommunications channel is completed for data communication between the subscriber's computer and the facility computer. Thus, in the external re-routing mode, available incoming lines are advantageously utilized as outgoing, call forwarding lines, thus eliminating need for spare telephone lines dedicated to this purpose.

The call forwarding device is equipped to maintain a record of each re-routed call, thus enabling defective telecommunications channels to be readily identified. In addition, the call forwarding device may include an internal modem by which it can report its record of re-routed calls to a facility network monitor where attending personnel can be alerted to the need for remedial action. Collocated call forwarding devices at the same or different facility answering sites may be communicatively linked together for coordination operations and reportings to the network monitor. Operational modes may be changed on site or remotely utilizing an established data communications channel.

The invention accordingly comprises the features of construction, combination of elements, and arrangement of parts, all of which will be exemplified in the construction hereinafter set forth and the scope of the invention will be indicated in the appended claims.

For a full understanding of the nature and objects of the present invention, reference may be had to the following detailed description taken in conjunction with the accompanying drawings, in which:

FIG. 6 is a circuit schematic diagram, partially in block form, of a portion of the line status display seen in FIG. 2; and FIG. 7 is a block diagram of an additional portion of the line status display of FIG. 2.

Corresponding reference numerals refer to like parts throughout the several views of the drawings.

DETAILED DESCRIPTION OF THE INVENTION

Figure 1:
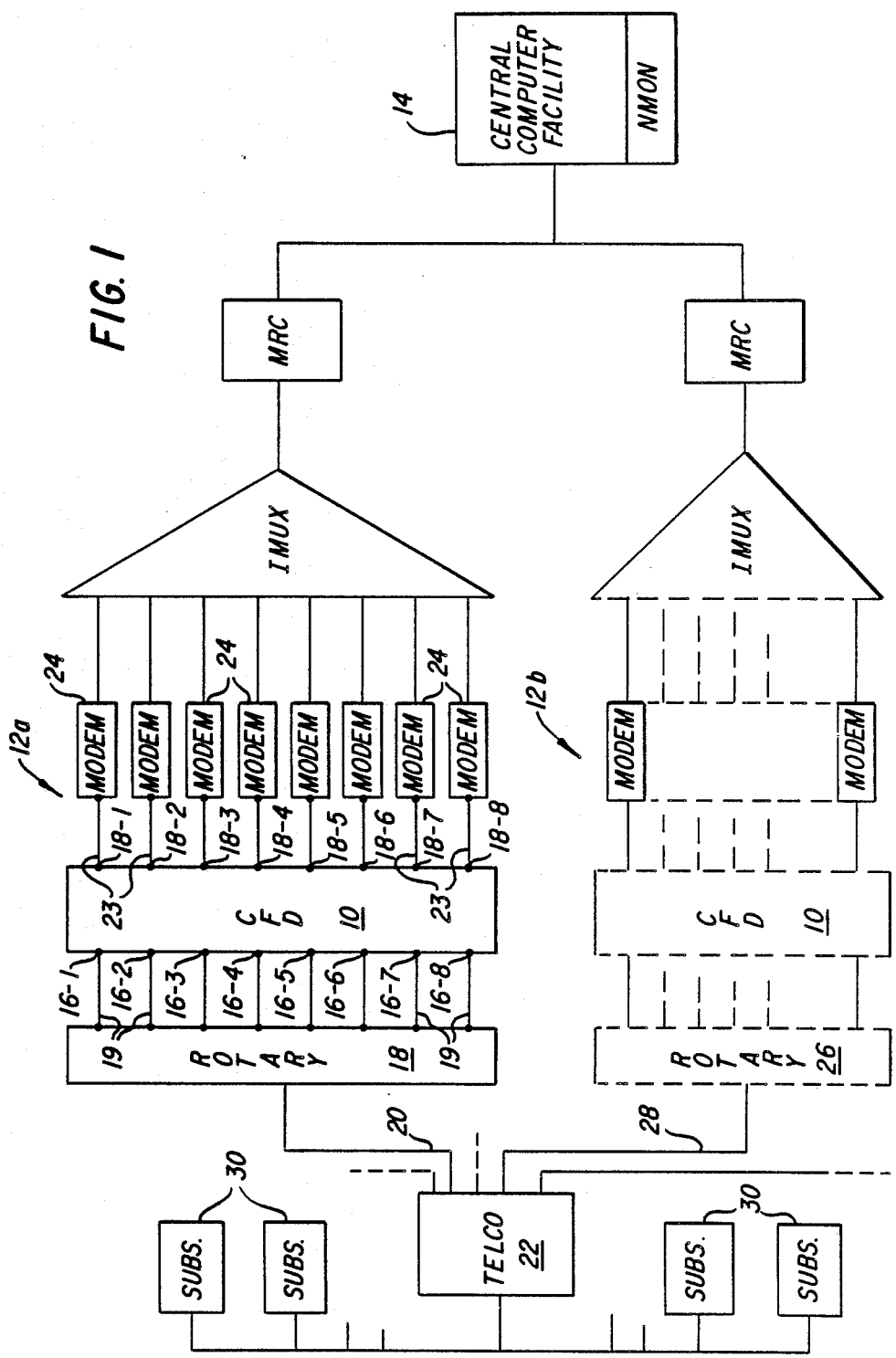
FIG. 1 is a block diagram of a typical telecommunications network equipped with the call forwarding device of the present invention.

The call forwarding device (CFD) of the present invention, indicated at 10 in FIG. 1, is included in each of two illustrated facility answering sites, generally indicated at 12a and 12b, serving a central computer facility 14. It will be appreciated there may be additional answering sites which may or may not include a call forwarding device 10. The call forwarding device of site 12a includes a plurality of input or rotary ports, for example eight such ports 16-1 through 16-8, and a coresponding number of output or modem ports 18-1 thorugh 18-8. Each rotary port is connected by a separate tip and ring conductor pair 19 to a separate outlet port of a conventional rotary switch 18 whose common inlet port is connected by a telephone cable 20 to a telephone company network exchange 22. Each call forwarding device modem port is connected by a separate tip and ring conductor pair 23 to the analog side of a separate modem 24. The digital side of each modem is separately connected via an intelligent multiplexor IMUX and a mini-remote concentrator MRC to the central computer facility in conventional fashion.

Facility answering site 12b is similarly equipped with a rotary 26 having its inlet port connected with the network exchange 22 via telephone cable 28 and its multiple outlet ports separately connected by tip and ring conductor pairs to the rotary ports of call forwarding device 10 thereat. The device modem ports are connected to the analog sides of separate modems whose digital sides are connected through an intelligent multiplexor IMUX and a mini-remote concentractor MRC to the central computer facility. A network monitor NMON, associated with the facility, monitors the operations of the various facility answering sites and may be utilized to condition the call forwarding devices thereat to selected routing modes, as described below.

To access the data processing services afforded by the central computer facility 14, a subscriber 30 dials or keys in the telephone number of one of the facility answering sites, e.g., site 12a, and this call is thus routed by the network exchange 22 via cable 20 to the inlet port of rotary 18. The call is directed to the next available outlet port, and appears, for example, at rotary port 16-1 of call forwarding device 10. Normally, each rotary port is directly connected within the call forwarding device by a separate internal telecommunications channel to an assigned one of the modem ports. That is, rotary port 16-1 is normally directly connected to modem port 18-1, rotary port 16-2 to modem port 18-2, and so on. Thus, a subscriber call appearing on rotary port 16-1 is routed initially to modem port 18-1 on the assumption that the one modem 24 connected thereto will answer. If it does, the subscriber call is completed, and a normal telecommunications channel is established for data exchange between the subscriber's computer and the central computer. The next subscriber call to facility answering site 12a is directed by rotary 18 to rotary port 16-2 of the call forwarding device for normal routing to modem port 18-2. When the one modem 24 connected thereto answers, another normal telecommunications channel is established between this next subscriber and the central computer. Thus, if all of the modems 24 at a facility answering site are regularly answering subscriber calls, call forwarding device 10 is virtually transparent to the subscribers.

As will be seen in the description to follow, the call forwarding device 10 of the present invention goes into action when a modem at a particular facility answering site where it is deployed fails to answer a subscriber incoming call. That is, when the call forwarding device is conditioned to an interanl re-routing mode, if, for example, a subscriber call entering rotary port 16-1 is not answered by the modem 24 connected with modem port 18-1 within a selected number of rings, the call forwarding device automatically internally re-routes this call to any one of the other modem ports 18-2 through 18-8 whose modem 24 is determined as being available (not busy) to answer. When this available modem answers, an alternative telecommunications channel is established between the subscriber and the central computer.

The call forwarding device can also be conditioned to an exteranl re-routing mode. In this case, if a modem 24 at site 12a fails to answer a subscriber call appearing at one rotary port within a selected number of rings, the call forwarding device dials out via any available other rotary port the telephone number of the backup facility answering site, e.g. site 12b. This dialout is directed by the network exchange 22 to rotary 26 of site 12b and is routed by the call forwarding device thereat to a connected modem for answer. Once this modem answers, an alternative telecommunications channel is established which runs through the network exchange 22, into and out of the rotary 18 and the call forwarding device 10 at answering site 12a, back through the network exchange, and through the rotary 26, the call forwarding device 10 and one of the modems at site 12b to the central computer facility 14. Thus in accordance with an important feature of the present invention, an externally re-routed or forwarded call utilizes as a portion of the established telecommunications channel any available incoming line which then becomes an outgoing line. Thus spare telephone lines dedicated to handling externally re-routed calls are avoided.

It will be understood that the facility answering site to which a subscriber call is forwarded or externally re-routed need not be equipped with a call forwarding device of the present invention. Moreover, the various facility answering sites may be geographically remote from one another.

The call forwarding device may also be conditioned to a force external re-routing mode in the event of a widespread answering site equipment failure. In this case, all subscriber calls are immediately externally call forwarded or re-routed. It will be appreciated that the interanl or external re-routing of a subscriber call to an alternative modem does not guarantee that this modem will answer. However, in the case of external re-routing, if the dialed-out backup answering site is equipped with a call forwarding device 10, the call can be further, automatically re-routed in the case of a RNA modem, if the calling subscriber is sufficiently patient.

In the case of a normal routing to a busied-out modem, the call forwarding device immediately initiates an internal or external re-routing procedure, depending on its pre-conditioned operating mode, without waiting for a selected number of rings.

Figure 2:
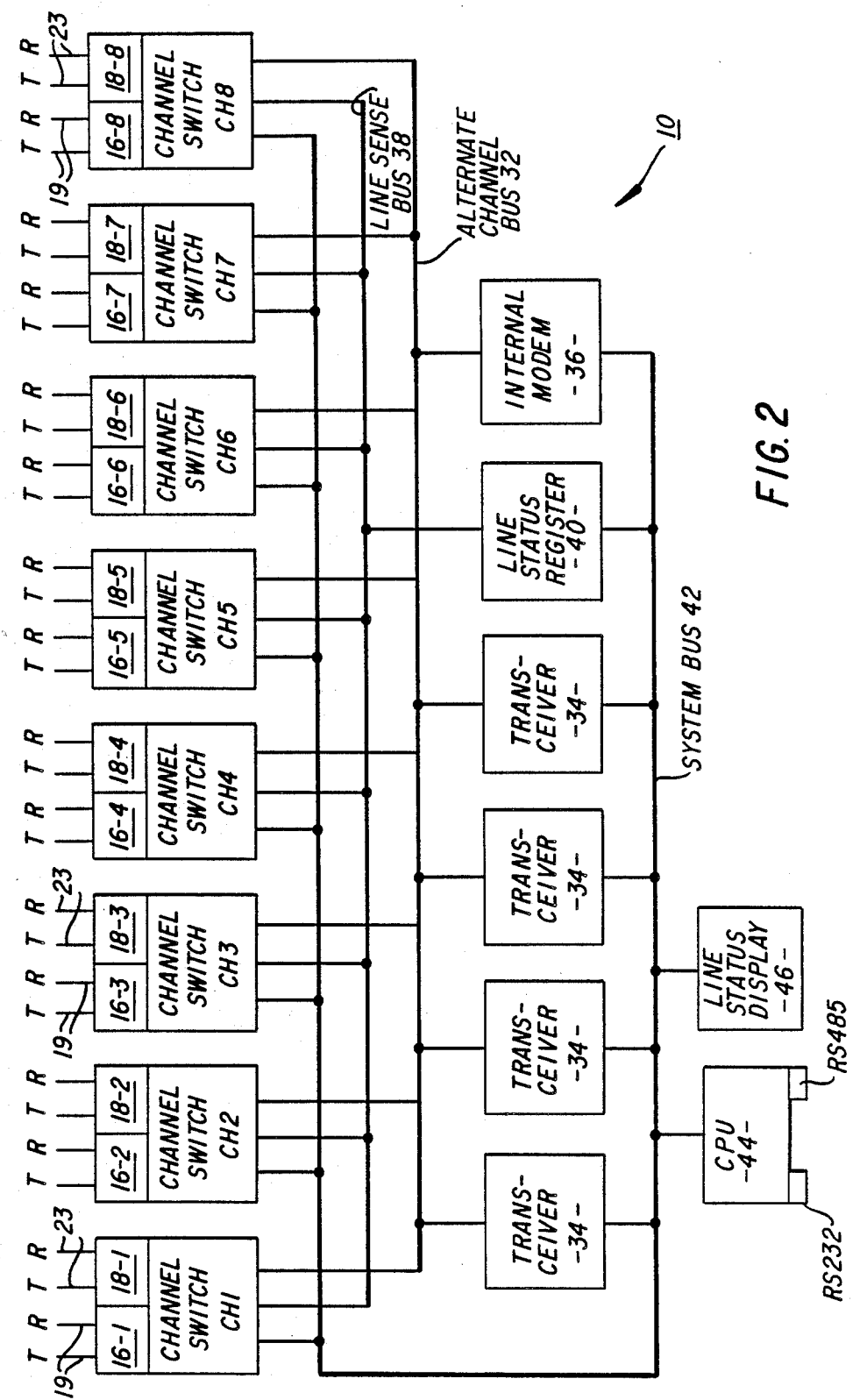
FIG. 2 is a block diagram of the call forwarding device of FIG. 1.

Turning to FIG. 2, call forwarding device 10 includes, in the illustrated embodiment, eight channel switches CH1–CH8, each equipped with the normally internally interconnected pair of rotary and modem ports. Thus, channel swith CH-1 includes the normally interconnected ports 16-1 and 18-1, channel switch CH-2 includes ports 16-2 and 18-2, et cetera. The separate tip and ring conductor pairs 19 from each rotary outlet port and the separate tip and ring conductor pairs 23 to each modem 24 (FIG. 1) are indicated at T and R in each instance. For internal and external re-routing purposes, the channel switches CH1–CH8 are commonly interconnected by an alternate channel bus 32 consisting of multiple tip and ring conductor pairs. Since, with an eight port call forwarding device, the maximum number of calls that can be concurrently externally re-routed is four, the alternate channel bus preferably includes four tip and ring conductor pairs. Each alternate channel conductor pair is selectively connectable with any two of the eight channel switches to establish an alternative telecommunications channel between the rotary port of one channel switch and the modem port of another channel switch (internal re-routing) or the rotary ports of two channel switches (external re-routing).

It will be appreciated that the call forwarding device can be expanded or contracted to any number of channel switches. However, in terms of praticality, it is preferred that the number of channel switches be an even number, since any call re-routing involves a pair of channel switches. Thus the number of alternate channels in bus 32 would typically be one-half the number of channel switches.

Switched onto each alternate channel tip and ring conductor pair of bus 32 is a separate transceiver 34 whose primary functions are (1) to dial out on its cnnected alternate channel and an available one of the channel switch rotary ports to al alternative facility answering site when an incoming subscriber call is to be externally re-routed, (2) detect any dual tone multiple frequency (DTMF) tones of an incoming call to the call forwarding device, and (3) to detect any calling activity on its connected alternate channel. In addition, an internal modem 36 is selectively switched onto any one of the four alternate channels of bus 32 to enable the call forwarding device 10 to communicate with the network monitor NMOM (FIG. 1) via an available channel switch modem port for status and re-routing activity reporting purposes. Alternatively, the internal modem can dial out through an available channel switch rotary port to an alternative facility answering site and thereby communicate with the network monitor. The internal modem also answers incoming calls to its call forwarding device from the network monitor as detected by a transceiver 34.

Still referring to FIG. 2, also connected to each channel switch CH1–CH8 is a line sense bus 38 which includes multiple conductors for separately conveying digital status signals to a line status register 40. These status signals indicate whether the rotary port of each channel switch is on or off hook, whether the particular modem 24 (FIG. 1) connected with the modem port of each channel switch is on or off hook, and if a ring signal announcing a subscriber call is present at the rotary port of any of the channel switches. The line status register 40 also registers call activity, specifically DTMF and call progress tone activity, on the alternate channels of bus 32 via separate conductors of line sense bus 38 running from the four transceivers 34. Call progress tones are detected by each transceiver in a manner to indicate that its connected alternate channel has become available for re-routing purposes.

The eight channel switches Ch1–CH8, the four transceivers 34, internal modem 36 and line status register are all connected in common with a system bus 42 leading to a central processing unit (CPU) 44, which may take the form of a Hitachi HD64180 processor. This CPU, together with its memory and decoding logic, is programmed to exert control over the overall operation of the call forwarding device. Thus, the CPU conditions the channel switches to a selected re-routing mode, internal or external, controls the transceivers in their dial out functions, polls the line status register pursuant to selecting available alternate channels and available channel switch rotary and modem ports, stores re-routing activity data, and generates reporting messages for communication via the internal modem to network monitor NMON, all by way of system bus 42. As further seen in FIG. 2, the front panel of the call forwarding device includes a line status display 46 comprising indicators connected with system bus 42 enabling an attendant to be visually apprised of the status of all of the call forwarding device rotary and modem ports and any internal modem activity. The front panel also includes various controls enabling an attendant to manually condition the call forwarding device to its various operating modes.

Figure 3:
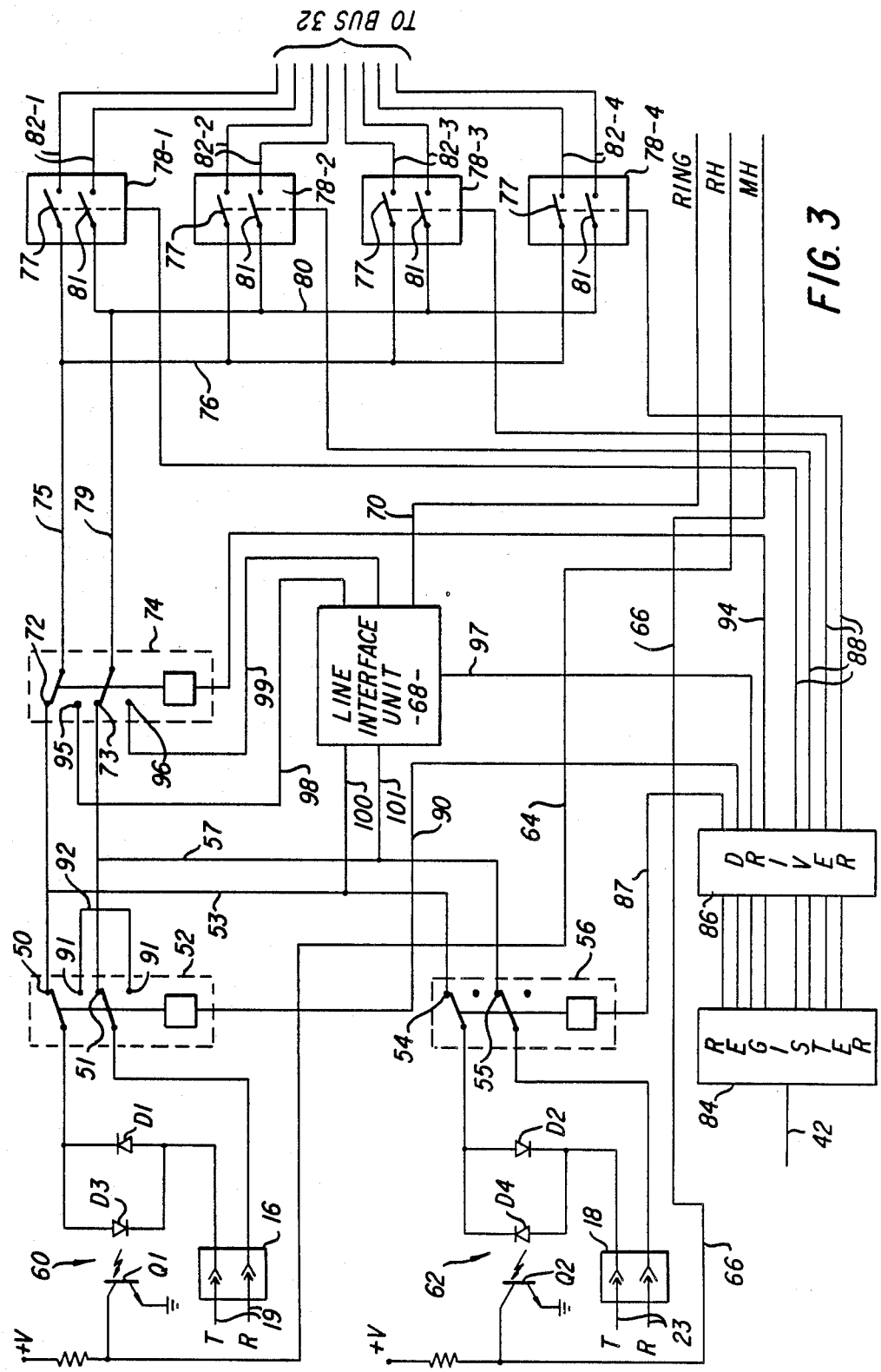
FIG. 3 is a circuit schematic diagram, partially in block form, representative of each of the channel switches seen in FIG. 2.

Each of the eight channel switches CH1-CH8 generally illustrated in FIG. 2 is identically constructed in the manner detailed in FIG. 3. The tip T and ring R conductors 19 from one of the outlet ports of rotary 18 of FIG. 1 are plugged into the rotary port 16 of the associated channel switch, while the tip T and Ring R conductors 23 to the associated modem 24 are plugged into modem port 18. The rotary and modem ports are interconnected by an internal channel comprising, on the tip side, of a diode D1, the normally closed contacts 50 of a mechanical, non-latching relay 52, a lead 53, the normally closed contacts 54 of a mechanical, non-latching relay 56 and a diode D2. On the ring side, this internal channel comprises the normally closed contacts 51 of relay 52, lead 57, and the normally closed contacts 55 of relay 56. Shunting diode D1 is a light emitting diode (LED) D3 of an optical isolator, generally indicated at 60. Diode D3 is optically coupled with a phototransistor Q1, whose collector is connected to a positive supply voltage through a load resistor and whose emitter is grounded. Similarly, diode D2 is shunted by an LED diode D4 optically coupled with a phototransistor Q2 of an optical isolator, generally indicated at 62. The collector of transistor Q2 is connected through a load resistor to positive supply voltage and its emitter is grounded.

Assuming the rotary outlet port connected to rotary port 16 and the modem connected modem port 18 of the channel switch detailed in FIG. 3 are both on hook when a subscriber call comes in, a loop current is permitted to flow in the internal channel of the channel switch. Loop current flow through diode D1 energizes optical isolator 60 and transistor Q1 is rendered conductive. Its collector goes to ground to generate a low rotary hook signal RH on lead 64. The same loop current energizes optical isolator 62 to generate a low modem hook signal MH on lead 66. The leads 64 and 66 from each of the channel switches CH1-CH8 are included in line sense bus 38 and terminate at line status register 40 (FIG. 2) where the on-hook status of the rotary outlets and modems connected with the channel switch ports are registered.

Still referring to FIG. 3, the ringing signals generated by an incoming subscriber call are tapped from leads 53 and 57 of the internal channel and applied to a telephone line interface unit 68, which may be a Cermatek Microelectronics, Inc. CH1818. This unit generates a signal RING on lead 70 which transitions from a high to a low logic signal level with each detected ring signal. A separate lead 70 runs with line sense bus 38 from each channel switch to line status register 40 of FIG. 2 where each RING signal transition, is registered. The number of rings for each subscriber call is tracked by CPU 44 until the modem 24 connected to the channel switch to which the subscriber call is being directed by the rotary is answered. If this modem answers, i.e., goes off hook, within a predetermined number of rings programmed into CPU44, a normal telecommunications channel is established from the rotary, through a channel switch from its rotary port 16 to its modem port 18, through the answering modem connected thereto, and on to the central computer 14 (FIG. 1). It will be noted that, as long as a modem answers within the predetermined number of rings, call forwarding device 10 is transparent to a subscriber.

On the other hand, if a subscriber call directed to a particular channel switch is not answered by its connected modem within the predetermined number of rings, the call forwarding device automatically goes into a re-routing mode. As seen in FIG. 3, the normally closed contacts 50 and 51 of relay 52 are also separately wired to the normally closed contacts 72 and 73, respectively, of a re-routing mechanical relay 74. Normally closed relay contact 72 is connected by leads 75 and 76 in common to one normally open terminal (illustrated as contacts 77 for ease of understanding) of each of four solid state relays 78-1 through 78-4. The normally closed contact 73 of mechanical relay 74 is connected by leads 79 and 80 to the normally open terminals (contacts 81) of relays 78-1 through 78-4. The lead pair 82-1 from relay 78-1 constitute the tip and ring conductor pair of one alternate channel of bus 32 (FIG. 2) commonly connected to relay 78-1 of all eight channels switches CH1-CH8. The respective lead pairs 82-2, 82-3, 82-4 from relays 78-2, 78-3, 78-4 are the tip and ring conductor pairs of the other three alternate channels of bus 32 commonly interconnecting the corresponding relays in each channel switch.

When CPU44 determines from the number of RING signal transitions entered into line status register 40 via lead 70 from the channel switch handling the incoming call that its modem has not timely answered, the CPU, from polling the line status register, determines which of the other seven channel switches and four alternate channels of bus 32 are unoccupied and thus available for call re-routing. The CPU then selects an available channel switch whose lead 70 is not undergoing RING signal transitions and whose rotary hook RH and modem hook MH signals on leads 64 and 66, respectively, are both at low logic levels. Orderly selection of an alternate channel (conductor pairs 82-1 through 82-4) is made from a queue of availabe alternate channels maintained by the CPU and continuously updated by repetitive polling of the line status register.

Assuming the call forwarding device is preconditioned to its internal re-routing mode, CPU 44 issues an appropriate instruction over system bus 42 to the channel switch receiving the unanswered (RNA) call. This instruction is entered in a register 84 of this channel switch, which then issues an output via a driven 86 and lead 87 causing modem relay 56 to open its normally closed contacts 54, 55. The RNA modem 24 is thus disconnected from the call forwarding device. The instruction also produces an output via dirver 86 on one of the four leads 88 to one of the relay 78-1 through 78-4, causing its contacts 77 and 81 to close and thereby connect the channel switch handling the RNA call to the available alternate channel of bus 32 selected by the CPU. The CPU also issues an appropriate instruction over system bus 42 to the one of the other seven channel switches selected as being available for re-routing. This instruction is entered into the register 84 of the selected channel switch, which, via driver 86, issues an output on lead 90 causing rotary port relay 52 to break with its normally closed contacts 50,51 and make which is normally open contacts 91. This operation disconnects the rotary port 16 of the selected channel switch from its modem port 18. It will be noted that rotary port relay contacts 91 are interconnected by a shunt 92 to, in effect, busy out its associated rotary port which will then be skipped by rotary 18 (FIG. 11) for all subsequent calls while the selected channel switch is occupied with re-routing a call. The resulting low logic level of modem hook signal RK advises the line status register accordingly so that the CPU can determine that this channel switch is currently occupied with re-routing a call.

The CPU instruction entered into the selected channel switch register 84 also produces an output via driver 86 and a lead 88 to close the contacts 77,81 of the corresponding one of the relays 78-1 through 78-4 that is closed in the channel switch receiving the yet to be answered subscriber call. As a result, the two channel switches are connected into the same alternate channel of bus 32 selected by the CPU. The call is thus re-routed through the receiving channel switch from its rotary port 16 through the normally closed contacts of its rellay 52, the normally closed contacts of its relay 74, and the closed contacts of one of its alternate channel relays 78-1 through 78-4 out onto the selected alternate channel. At the other end of the selected alternate channel, the call is re-routed through the closed contacts of the alternate channel relay, the normally closed contacts of relay 74, leads 53, 57, and the normally closed contacts of relay 56 to the modem port 18, all in the selected channel switch. The modem 24 connected with this modem port then receives a ringing signal, and, upon answering, a telecommunications channel is established with the central computer for the re-routed call. When this channel is broken, either by the subscriber of the modem 24 hanging up, the status signals from the involved two channel switches so advise the line status register of this fact, and the CPU issues instructions returning the relays therein to their normal states.

If the call forwarding device is preconditioned to its external re-routing state, the CPU, upon determining that a call has not been answered within the selected number of rings, polls to the line status register to select an available channel switch and alternate channel. The CPU then enters the appropriate instructions via system bus 42 into the registers 84 of the ring, no answer (RNA) channel switch and the available channel switch selected for external re-routing. The instructions to both channel switches are to switch out their modem ports 18, i.e., open their relays 56. The instruction to the selected channel switch then signals roouting delay 74 via driver 86 and lead 94 to switch to its normally open contacts 95 and 96 and signals line interface unit 60 via lead 97 to connect into leads 98 and 99 running from the normally open routing relay contacts. In addition, the appropriate one of the relays 78-1 through 78-4 is closed to connect into the alternate channel selected by the CPU. The CPU then connects the one transceiver 34 assigned to the selected alternate channel into this channel and instructs this transceiver to dial out the telephone number of an alternative facility answering site, e.g., site 12b in FIG. 1. The DTMF dial out tones are impressed on the selected alternate channel and communicated through the closed alternate channel relay, the now closed contacts 95,96 of relay 74, and leads 98,99 to line interface unit 68 of the selected channel switch. This line interface unit provides the requisite impedance match and DC isolation in the process of coupling the dial-out tones onto output leads 100,101 for communication via leads 53,57, the normally closed contacts of relay 52 and out through rotary port 16 of the selected switch channel. From there, the dial out tones are routed by rotary 18 into the network exchange 22 and out again to the alternate or backup answering site 12b seen in FIG. 1. Once a modem thereat answers, the appropriate alternate channel relay in the RNA channel switch is closed to connect its modem port 16 via the normally closed contacts of relays 52 and 74 into the selected alternate channel, thereby completing the externally re-routed subscriber call through to the central computer. When this telecommunications channel is broken, the involved channel switches are returned to their normal states under instructions issued by the CPU. It will be noted that the rotary port of a channel switch whose modem port has been taken off-hook in the absence of an incoming ring, i.e., the connected modem has been busied out, is available for external re-routing, and the CPU can be programmed to regularly select this rotary port for this purpose. The CPU can recognize a busied out modem port from polling the line status register as one that has gone off-hook and either has not received a ring signal or is not involved in a network dialout to its internal modem.

As noted generally above, call forwarding device 10 may also be conditioned to a forced external re-routing mode, wherein every incoming subscriber call is externally re-routed. The CPU executes the same set of instructions described above without waiting for the prescribed number of rings.

Figure 4:
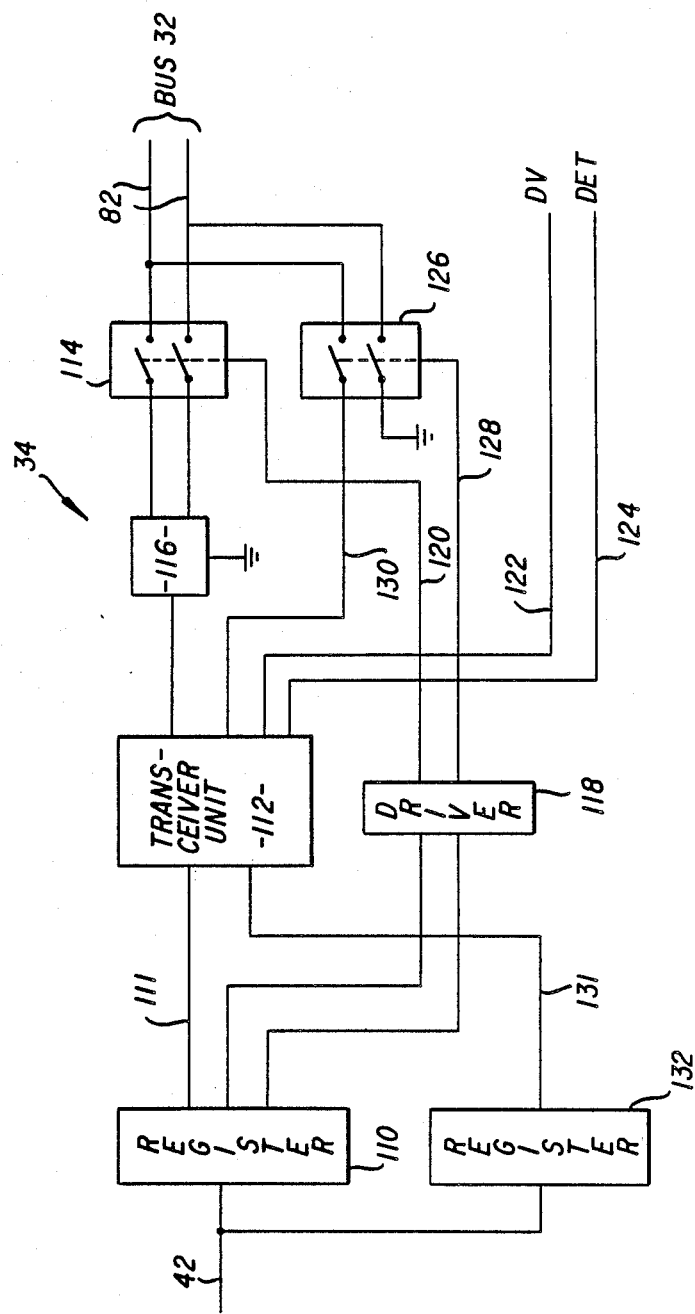
FIG. 4 is a circuit schematic diagram, partially in block form, representative of each of the transceivers seen in FIG. 2.

Each transceiver circuit 34, as seen in greater detail in FIG. 4, includes a register 110 into which CPU instructions are entered. This register is connected to a suitable transceiver unit 112, such as a Silicon System Inc. SSI 2089 DTMF transceiver. An input of this transceiver unit is connectable to the tip and ring conductor pair 82 of its assigned one of the alternate channels of bus 32 by one solid state relay 114 through an RC coupling and threshold detector network, commonly indicated at 116. Relays 114 are normally closed onto their assigned alternate channels, thereby enabling transceiver units 112 of the transceivers 34 to detect any DTMF and call progress tones thereon. If DTMF tones are detected on an alternate channel, its assigned transceiver unit issues a high logic level signal DV on a separate lead 122 to the line status register 40. Similarly, when call progress tones are detected, the transceiver unit issues a high logic level signal DET on a separate lead 124 to the line status register. In addition, the transceiver unit decodes any detected DTMF tones and identifies the type of detected call progress tones, i.e., dial tone, distant ring or distant busy, and enters this information into a regiister 132 via leads 131. Thus, when the CPU pools the line status register, the logic states of the signal DET and DV from each of the four transceiver circuits 34 are sampled to determined which of the alternate channels has experience DTMF or call progress tone activity. If so indicated on a particular alternate channel the CPU interrogates register 132 of the assigned transceiver to determine the type of activity. From the call process information the CPU can determine the termination of a call over an alternate channel, which then has come available for re-routing and thus can be placed in the queue. The CPU also returns the involved channel switches to their normal states at this time.

If the call forwarding device is in its external re-routing mode, once an available alternate channel is selected from the queue by the CPU, the appropriate transceiver circuit 34 is instructed to close relay 126 via driver 118 and lead 128. The CPU then controls the transceiver unit 112 of the appropriate transceiver 34 via leads 111 to generate DTMF dialout tones on output lead 130, which are impressed on the tip and ring conductor pair of the selected alternate channel. Relay 114 remains closed at this time to enable the transceiver unit to detect distant call progress tones originating at the backup facility answering site to which the dialout is directed, thereby enabling the CPU to exert the requisite control over the external re-routing mode activities.

Figure 5:
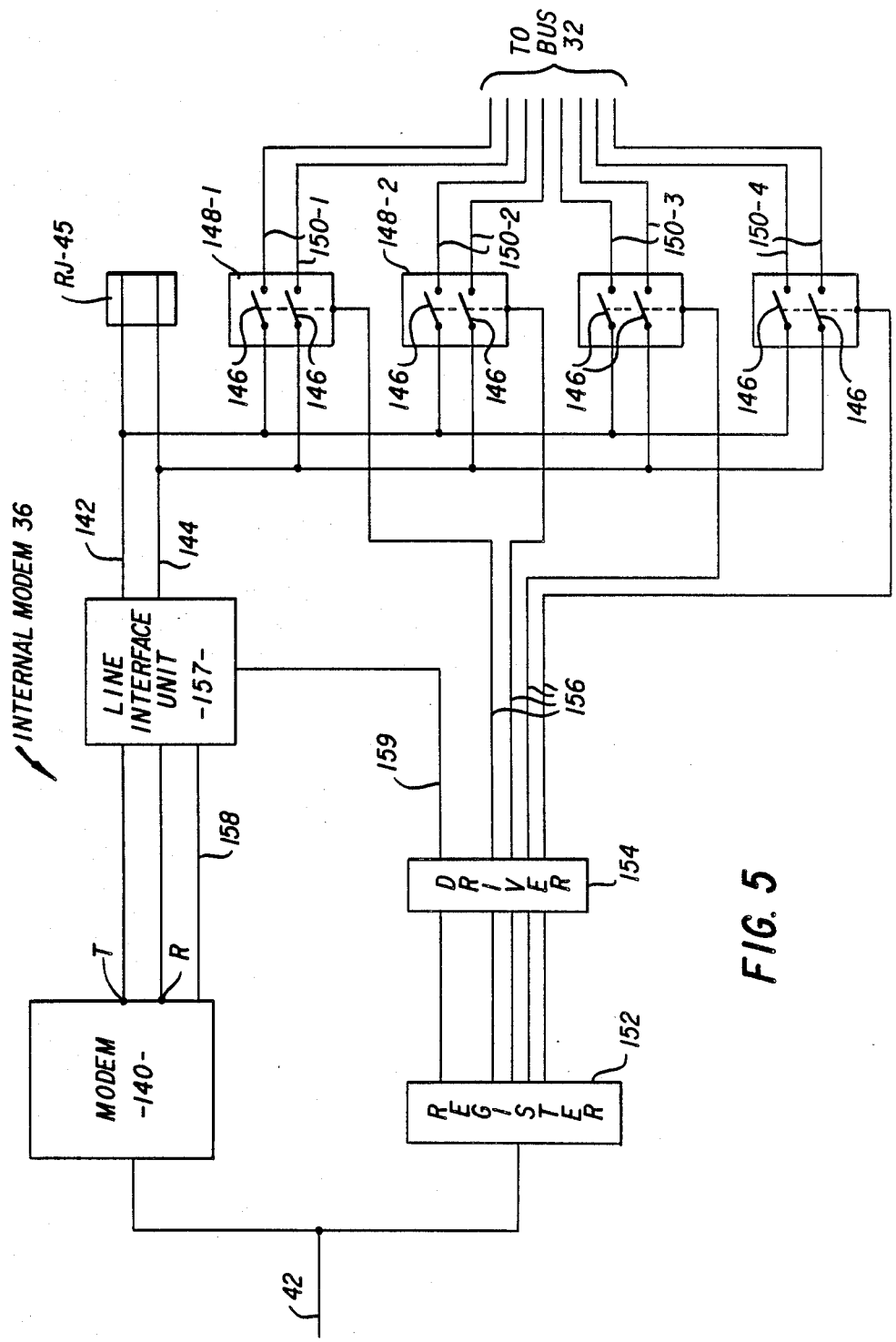
FIG. 5 is a circuit schematic diagram, partially in block form, of the internal modem seen in FIG. 2.

Turning to FIG. 5, the internal modem 36 of FIG. 2 includes a suitable modem 140, such as a Silicon System SSI 73IC2224 modem, which is connected via system bus 42 to CPU 44. This modem is capable of generating DTMF dialout tones and has call progress detection capability. Tip and ring terminals of modem 140 are connected through a line interface unit 157 to leads 142 and 144 running to normally open pairs of terminals (contacts 146) of each of four alternate channel solid state relays 148-1 through 148-4. Tip and ring conductor pairs 150-1 through 150-4 separately connect these relays into each of the four alternate channels of bus 32. CPU instructions entered via system bus 42 into register 152 generates a command via driver 154 and one of the leads 156 to close one of the relays 148-1 through 148-4 onto the one of the available alternate channels selected by the CPU. The CPU also instructs an available channel switch to make the necessary relay connections to its modem port, thereby enabling the CPU to dialout via modem 140 and establish a telecommunications channel to carry on data communication with the network monitor NMON FIG. (1).

Alternatively, the CPU can instruct an available channel switch to make the requisite relay connections to its rotary port for a CPU dialout to the network monitor via a backup anwering site. In addition, the internal modem can answer a network dialout to its call forwarding device via a modem 24, the modem port connected therewith, and an available alternate channel. Recognition of a network dialout to a particular call forwarding device is performed by one of its tranceivers through the decoding of DTMF tones dialout tones.

Still referring to FIG. 5, the tip T and ring R terminals of modem 140 may also be connected to a RJ-45 port through line interface unit 157, which may be identical to the channel switch line interface units. Thus, the call forwarding device can accept incoming calls addressed to its internal modem and make outgoing calls over a dedicated phone line connected to the RJ-45 port. An incoming call is announced by a ring signal appearing on lead 158 from line interface unit 157 to modem 140. When the internal modem 36 is connected into one of the alternate channels of bus 32, the CPU instructs the line interface unit over lead 159 to switch out the RJ-45 port.

Each time the line status register is polled, which may be on a periodic basis such as every 0.1 seconds, the CPU reads the current status of each channel switch and alternate channel into its memory where a status report is compiled for transmission via the internal modem to the network monitor on demand. Based on these reports, malfunctioning equipment, such as RNA modems, can be readily recognized and early remedial action taken.

As indicated in FIG. 2, CPU 44 is equipped with an RS232 port to which a PC terminal (not shown) may be connected to enter commands, make programming changes and to receive status reports directly. In addition, the CPU is equipped with an RS485 port enabling collocated call forwarding devices to be interconnected for communication with each other. This feature is advantageously used for status reporting, in that the CPU of one call forwarding device may be programmed to received status reports from the other call forwarding devices collocated at the same facility answering site for compilation into a single status report covering the entire site, which is then transmitted by one of the call forwarding devices to the network monitor. Under these circumstances, only the reporting one of the collocated call forwarding devices need be equipped with an internal modem.

Turning to FIG. 6, to provide current status information of the call forwarding device to on-site personnel, the front panel is provided with a row of eight indicators 160-167, one for each of the eight channel switch rotary ports 16-1 through 16-8. Each indicator includes a pair of separately energizable light emitting diodes D9 and D10 of different colors, e.g., red and green. Each time the line status register is polled, in addition to storing the status information, the CPU enters the rotary port status of each channel switch CH1-CH8 into a register 170, and the indicator diodes are selectively energized accordingly via a driver 172. Rotary ports status information may be indicated as follows. If neither diode D9, D10 of an indicator is energized, its assigned rotary port is on-hook. If the green LED of an indicator is energized, its assigned rotary port is off-hook and in a normal routing or pass-through mode. A flashing green indicates a ring signal entering the assigned rotary port. Energization of the red LED of indicator means that its assigned rotary port is off-hook and in a re-routing mode. And finally, a flashing red indication means that the assigned rotary port is busied out.

Further on-site status information is provided by the front panel line status display illustrated in FIG. 7. This display includes three hex element digit display units 176, 178 and 180. A register 182 is indexed by a sequencer 184 in response to manual depression of a pushbutton 186 to select a digit from "1" to "8" assigned to channel switches CH1 through CH8, respectively, for presentation by display unit 176. The CPU is advised of the selected channel switch over data bus 42. In response, the CPU generates an instruction based on the latest polling of the line status register and additional status information stored in memory. This instruction is transmitted over data bus 42 to line status display register 188. Pursuant to this instruction entered into register 188, display unit 178 displays the identifying digit of any channel switch involved with the selected channel switch represented by the display of display unit 176 in re-routing a call. The third display unit 180 is then controlled to indicate the character of this re-routing involvement, if any. Thus, depending on the digit displayed by unit 180, an attendant is advised of which port, rotary or modem, of the selected channel switch identified by display unit 176 is interconnected with which port, rotary or modem, of the channel switch identified by display unit 178. If the rotary ports of the involved two channel switches are interconnected to externally re-route a call, display unit 180 indicates whether re-routed call is inbound to the channel switch identified by display unit 176 and outbound from the channel switch identified by display unit 178, or vice versa. Also, display unit 180 indicates if the internal modem is calling out via the rotary or modem port of the selected channel switch.

In view of the foregoing, it is seen that the objects set forth above, including those made apparent from the Detail Description set forth, are efficiently attained, and, since certain changes may be made in the construction of the disclosed embodiment without departing from the scope of the invention, it is intended that matters of detail be taken as illustrative and not in a limiting sense.

Having described the invention, what is claimed as new and desired to secure by Letters Patent is:

1. A call forwarding device for installation between a telephone rotary switch having a plurality of outlet ports and an array of separate modems of a facility answering site, said call forwarding device including, in combination:
   A. a channel bus including a plurality of alternate telecommunications channels,
   B. a plurality of channel switches, each said channel switch having
      (1) a rotary port connected with a different one of the rotary switch outlet ports,
      (2) a modem port connected with a different modem of the modem array,
      (3) an internal telecommunications channel normally interconnecting said rotary and modem ports,
      (4) switching means selectively connecting its said channel switch into any one of said alternate channels; and
   C. a central processing unit connected to each said channel switch by a system bus, said central processing unit acting in response to the failure of modem connected to said modem port of a first one of said channel switches to timely answer a telephone call inbound on said rotary port thereof to select an available second one of said channel switches and an available one of said alternate channels and to condition said switching means of said first and second ones of said channel switches such as to re-route the telephone call from said first one to said second one of said channel switches over said available one of said alternate telecommunications channels.

2. The call forwarding device defined in claim 1, wherein said central processing unit conditions said second one of said channel switches to internally re-route the telephone call to said modem port thereof.

3. The call forwarding device defined in claim 1, wherein said central processing unit conditions said second one of said channel switches to externally re-route the telephone call to said rotary port thereof and out to a backup facility answering site.

4. The call forwarding device defined in claim 2, wherein each said channel switch includes a first switch normally connecting said rotary port to said internal channel and a second switch normally connecting said modem port to said internal channel, said central processing unit conditioning said first switch to disconnect said rotary port from said internal channel of said second one of said channel switches and conditioning said second switch to disconnect said modem port from said internal channel of said first one of said channel switches pursuant to internally re-routing the telephone call.

5. The call forwarding device defined in claim 3, wherein each said channel switch includes a first switch normally connecting said rotary port to said internal channel and a second switch normally connecting said modem port to said internal channel, said central processing unit conditioning said second switches of said first and second ones of said channel switches to disconnect said modem ports from said internal channels thereof pursuant to externally re-routing the telephone call to the backup facility answering site.

6. The call forwarding device defined in claim 4, which further includes a plurality of sensiing means, each connectable into a different one of said alternate channels to detect telephone call activity thereon and to indicate to said central processing unit those of said alternate telecommunications channel available for internal telephone call re-routing.

7. The call forwarding device defined in claim 6, wherein each said channel switch includes a first detector for indicating to said central processing unit the hook status of said rotary port and a second detector for indicating to said central processing unit the hook status of said modem port pursuant to identifying an available said second one of said channel switches.

8. The call forwarding device defined in claim 7, wherein each said channel switch includes a third detector for sensing the ring signals of a telephone call inbound at said rotary port, said third detector generating a count signal in response to each ring signal for accumulation by said central processing unit, said central processing unit initiating internal re-routing of the telephone call when the modem connected with said modem port fails to answer within a prescribed number of said count signals.

9. The call forwarding device defined in claim 8, which further includes an internal modem connected by said system bus to said central processing unit and connectable under the control of said central processing unit into any available one of said alternate telecommunications channels, said central processing unit conditioning an available one of said channel switches and controlling said internal modem to call out by way of any available one of said alternate channels and said channel switches.

10. The call forwarding device defined in claim 9, which further includes a line status register and a line sense bus connecting said line status register with said first, second and third detectors of each said channel switch and with said sensing means, said central processing unit polling said line status register to identify those of said channel switches and said alternate channels currently available for internal re-routing of an inbound telephone call.

11. The call forwarding device defined in claim 10, wherein said central processing unit compiles a record of internal telephone call re-routings and calls out through said internal modem to communicate said re-routing record externally said call forwarding device.

12. The call forwarding device defined in claim 10, wherein said central unit compiles a record of internal telephone call re-routings and, in response to a dialout to said call forwarding device answered by said internal modem, communicates said re-routing record externally of the facility answering site.

13. The call forwarding device defined in claim 10, which further includes display means for locally indicating the current status of each said channel switch.

14. The call forwarding device defined in claim 5, which further includes a plurality of transceivers each connectable into a different one of said alternate channels to detect telephone call activity thereon and to indicate to said central processing unit those of said alternate telecommunications channels available for external telephone call re-routing.

15. The call forwarding device defined in claim 14, wherein each said channel switch includes a first detector for indicating to said central processing unit the hook status of said rotary port and a second detector for indicating to said central processing unit the hook status of said modem port pursuant to identifying an available said second one of said channel switches.

16. The call forwarding device in claim 15, wherein each said channel switch includes a third detector for sensing the ring signals of a telephone call inbound at said rotary port, said third detector generating a count signal in response to each ring signal for accumulation by said central processing unit, said central processing unit initiating external re-routing of the telephone call when the modem connected with said modem port fails to answer within a prescribed number of said count signals.

17. The call forwarding device defined in claim 16, wherein each said transceiver is selectively controlled by said central processing unit to dial out via the one of said alternate channels connected therewith, if available, and said rotary port of said second one of said channel switches the telephone number of the backup facility answering site pursuant to externally re-routing a telephone call thereto.

18. The call forwarding device defined in claim 17, which further includes an internal modem connected by said system bus to said central processing unit and connectable under the control of said central processing unit into any available one of said alternate channels, said central processing unit conditioning an available one of said channel switches and controlling said internal modem to call out externally of the facility answering site by way of said available ones of said alternate telecommunications channels and said channel switches.

19. The call forwarding device defined in claim 18, which further includes a line status register and a line sense bus connecting said line status register with said first, second and third detectors of each said channel switch and with each said transceiver, said central processing unit polling said line status register to identify those of said channel switches and said alternate telecommunications channels currently available for external re-routing of an inbound telephone call.

20. The call forwarding device defined in claim 19, wherein said central processing unit compiles a record of external telephone call re-routings and calls out through said internal modem to communicate said re-routing record externally of call forwarding device.

21. The call forwarding device defined in claim 19, wherein said central processing unit compiles a record of external telephone call re-routings and, in response to a dialout to said call forwarding device answered by said internal modem, communicates said re-routing record externally of the facility answering site.

22. The call forwarding device defined in claim 19, which further includes display means for locally indicating the current status of each said channel switch.

23. The call forwarding device defined in claim 14, wherein the number of said channel switches is twice the number of said alternate channels.

24. A call forwarding device for installation between a telephone rotary switch having a plurality of outlet ports and an array of separate modems of a facility answering site, said call forwarding device including, in combination:

A. a plurality of alternate telecommunications channels;

B. a plurality of channel switches, each said channel switch including (1) a rotary port connected with a different one of the rotary switch outlet ports,
(2) a modem port connected with a different modem of the modem array,
(3) an internal telecommunications channel normally interconnecting said rotary and modem ports,
(4) switching means selectively connecting its said channel switch into any one of said alternate channels, and
(5) a routing switch having a first condition connecting said switching means to said modem port over said internal channel and a second condition connecting said switching means to said rotary port; and C. a central processing unit for conditioning said channel switches to a selected one of internal and external re-routing modes in response to the failure of a modem connected to said modem port of a first one of said channel switches to timely answer a telephone call inbound on said rotary port thereof:

(1) to select an available second one of said channel switches,
(2) to select an available one of said alternate channels,
(3) to condition said switching means of said first and second ones of said channel switches to effect connections thereof into said available one of said alternate channels,
(4) to position said routing switch to its said first condition to re-route the telephone call from said rotary port of said first one of said channel switches to said modem port of said second one of said channel switches via said available one of said alternate channels and said internal channel of said second one of said channel switches pursuant to said internal re-routing mode, and
(5) to position said routing switch to its said second condition to re-route the telephone call from said rotary port of said one of said channel switches to said rotary port of said second one of said channel switches via said available one of said alternate channels pursuant to said external re-routing mode.

25. The call forwarding device defined in claim 24, wherein said routine switch normally resides in its said first condition.

26. The call forwarding device defined in claim 24, wherein each said channel switch further includes a first switch normally connecting said rotary port to said internal channel and a second switch normally connecting said modem port to said internal channel, said central processing unit (1) conditioning said first switch to disconnect said rotary port from said internal channel of said second one of said channel switches and conditioning said second switch to disconnect said modem port of said first one of said channel switches pursuant to said internal re-routing mode, and
(2) conditioning said second switches of said first and second ones of said channel switches to disconnect said modem ports from said internal channels thereof pursuant to said external re-routing mode.

27. The call forwarding device defined in claim 26, which further includes a plurality of transceivers each connectable into a different one of said alternate channels to detect telephone call activity thereon and to indicate to said central processing unit those of said alternate channels available for telephone call re-routing.

28. The call forwarding device defined in claim 27, wherein each said channel switch further includes a first detector for indicating to said central processing unit the hook status of said rotary port and a second detector for indicating to said central processing unit the hook status of said modem port pursuant to identifying an available said second one of said channel switches.

29. The call forwarding device defined in claim 28, wherein each said channel switch further includes a third detector for sensing the ring signals of a telephone call inbound at said rotary port, said third detector generating a count signal in response to each ring signal for accumulation by said central processing unit, said central processing unit initiating re-routing of the telephone call when the modem connected with said modem port fails to answer within a prescribed number of said count signals.

30. The call forwarding device defined in claim 29, wherein each said transceiver is selectively controlled by said central processing unit to dial out via the one of said alternate telecommunications channels connected therewith, if available, and said rotary port of said second one of said channel switches the telephone number of the backup facility answering site pursuant to externally re-routing a telephone call thereto.

31. The call forwarding device defined in claim 30, which further includes an internal modem connected by said system bus to said central processing unit and connectable under the control of said central processing unit into any available one of said alternate channels, said central processing unit conditioning an available one of said channel switches and controlling said internal modem to call out externally of said call forwarding device by way of said available ones of said alternate channels and channel switches.

32. The call forwarding device defined in claim 31, which further includes a line status register and a line sense bus connecting said line status register with said first, second and third detectors of each said channel switch and with each said transceiver, said central processing unit polling said line status register to identify those of said channel switches and said alternate channels currently available for re-routing of an inbound telephone call.

33. The call forwarding device defined in claim 32, wherein said central processing unit compiles a record of telephone call re-routings and calls out through said internal modem to communicate said re-routing record externally of said call forwarding device.

34. The call forwarding device defined in claim 33, wherein said central processing unit compiles a record of telephone call re-routings and, in response to a dial out to said call forwarding device answered by said internal modem, communicates said re-routing record externally of the facility answering site.

35. The call forwarding device defined in claim 29, which further includes display means for locally indicating the current status of each said channel switch.

36. The call forwarding device defined in claim 24, wherein the number of said channel switches is equal to twice the number of said alternate channels.

* * * * *